May 15, 1945.  J. DRISCOLL ET AL  2,376,039
PACKING
Filed April 9, 1943
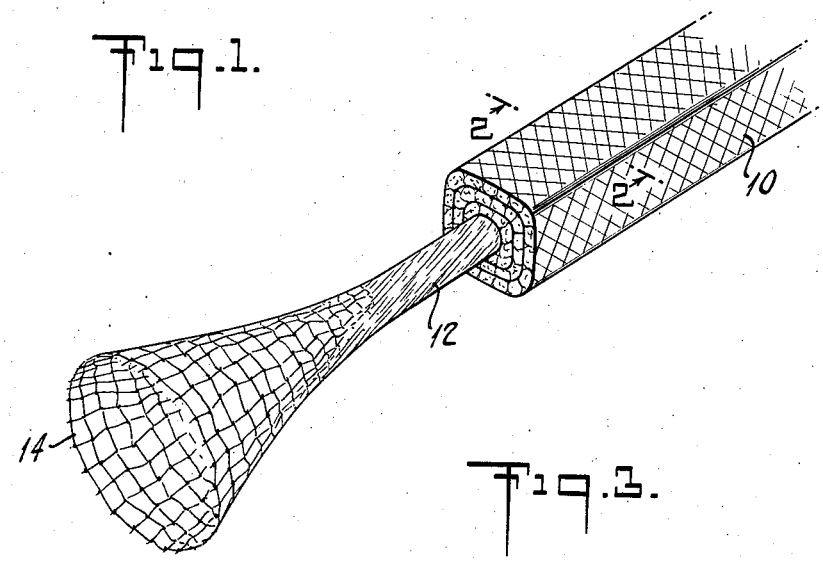
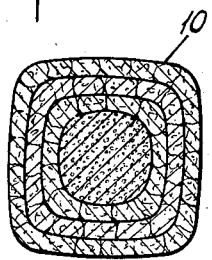
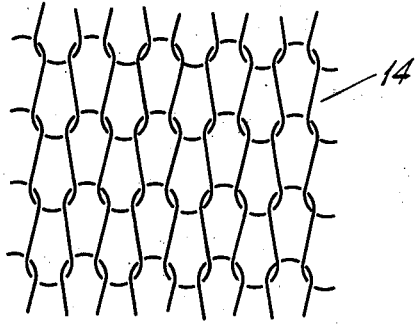
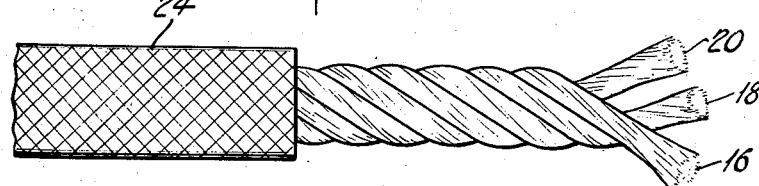
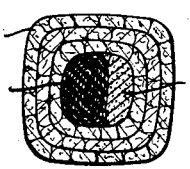
INVENTOR.
JAMES DRISCOLL.
EMIL. P. POLTORAK.
BY Virgil C. Kline
ATTORNEY Patented May 15, 1945

2,376,039

UNITED STATES PATENT OFFICE 2,376,039

PACKING

James Driscoll, Plainfield, and Emil J. Poltorak, Somerville, N. J., assignors to Johns-Manville Corporation, New York, N. Y., a corporation of New York Application April 9, 1943, Serial No. 482,440

7 Claims. (Cl. 288—11)

The present invention relates to improvements in packings and particularly to packings for use with piston rods, plungers, shafts, and other moving mechanical elements.

In mechanical packings for such uses the property of resilience is so important a factor in promoting economy of operation and long life that many attempts have been made heretofore to improve this characteristic. One type of packing previously proposed has comprised a rubberized fabric wound around a solid rubber core. The core is semi-cured and formed to predetermined size before the fabric is wound, and after winding the entire packing is vulcanized to complete the cure. Another proposal has involved the use of concentric windings of rubberized fabric around a mandrel to leave a hollow core when the packing is removed from the mandrel. The resilient characteristic of the packings produced, as referred to above, are effective for relatively short periods of time and the packings are limited in use to temperatures of approximately 300° F. due to the rapid deterioration of the rubber wrapper, and the core where it is employed, when subjected to the temperatures and to the lubricants met in service. In the hollow core type packing such conditions also result in the collapse of the packing.

The instant invention has for its principal object the provision of a novel packing which, by virtue of the relatively indestructible character of the core, retains its original resiliency substantially indefinitely and which is unaffected by the temperature and pressure conditions within the ranges normally encountered. The packing in accordance with the invention is also one which is unaffected to any substantial extent by lubricants and other normally deteriorating influences.

Another object of the invention is the provision of a packing as referred to comprising a core member of a compacted resilient metal fabric having a fabric cover or sheath, the latter carrying an impregnant highly resistant to deterioration by oil, heat and the like.

A still further object of the invention is the provision of a packing employing a compacted core formed of a knitted metal fabric.

Our invention will be more fully understood and further objects and advantages thereof will become apparent when reference is made to the more detailed description thereof which is to follow and to the accompanying drawing, in which:

Fig. 1 is a perspective view of a packing in accordance with the invention, the core member being shown extended and exploded to illustrate its construction;

Fig. 2 is a sectional view taken on the line 2—2 of Fig. 1;

Fig. 3 is a detail view on an enlarged scale illustrating the fabric employed;

Fig. 4 is an elevational view of a packing embodying certain modifications of the invention; and Fig. 5 is a view similar to Fig. 2 illustrating a modified form of packing.

Referring now to the drawing, and particularly to Figs. 1-3, there is shown a packing 10 adapted for general purposes but particularly suitable for use in conjunction with piston rods, plungers, shafts, and other such moving mechanical elements. The packing comprises a core 12 which in accordance with the invention is composed of a compacted looped metal fabric 14. Fabric 14 is made of a metal strand or strands formed into a fabric body by knitting or other fabricating steps to provide a plurality of interengaged loops. A knitted fabric, as illustrated in Fig. 3, is preferred. The material selected for the strands is preferably a relatively hard metal or metal alloy, thin flat ribbons of stainless steel being preferred for this purpose. However, other metals and alloys of metals may be employed as desired. Suitably the fabric is of circular knit construction although one or more layers of flat knit fabric may be used.

In forming the core the fabric is compacted by twisting or braiding a length or lengths thereof into single or multiple strands to form a resilient core member of very open structure. In the construction shown in Figs. 1 and 2 a single length of the fabric is twisted on itself to form the core. Fig. 4 illustrates a multiple strand core including strands 16, 18 and 20. In this embodiment each of the strands comprises a length of the fabric twisted on itself, the several strands in turn being twisted together as illustrated. Due to the compacting of the looped fabric, as described above, a core structure is obtained exhibiting permanent resilience even under severe service conditions. As will be understood the twisting or other compacting steps causes the loops to assume various positions to impart to the core yielding resistance to deformation by forces acting in any direction.

Core 12 is covered with a jacket which may take different forms. In the construction of Fig. 1, the jacket comprises a plurality of layers of a suitable woven fabric made from asbestos, cotton, flax, hemp or synthetic yarns or the like preferably previously treated or impregnated with a heat and oil resistant binder material to make the entire jacket resistant to oil and heat. The woven fabric is suitably wound in a plurality of convolutions around the core. The binder preferably comprises a heat-setting synthetic resin such as a phenolic resin. However, other types of synthetic or natural resins or the like having the desired properties may be used, and for some services natural or synthetic rubber in cement or compound form is satisfactory.

In the preferred embodiment, either during the formation of the packing or thereafter, the packing may be impregnated to any desired extent with a liquid or solid lubricant. For this purpose oil, soft metal particles, graphite, grease, mica and the like may be used. The lubricant may be distributed throughout the entire packing or only in a portion thereof as desired. The open, spring-like structure of the core permits absorption of relatively large amounts of the lubricant which, when heat and pressure are applied to the packing, seeps to the surface greatly adding to the life of the packing in service.

In lieu of employing a convoluted fabric for the jacket, as described above, the jacket may be constructed directly on the packing by braiding or the like. Fig. 4 illustrates a jacket 24 of such construction braided from strands of asbestos, cotton, flax, hemp or the like. The jacket, which may be braided in single or multiple layers, is treated with a heat and oil resistant adhesive, similarly as in the other form, and the entire packing is preferably impregnated with a lubricating material.

The packing may be shaped if desired to have any cross-sectional configuration by subjecting it to molding pressures. The generally square cross-section of the embodiment illustrated is one example of the several shapes which may be adopted.

Fig. 5 illustrates a type of packing having a composite core which embodies the instant invention. The core includes a section 26 composed of a yieldable material, for example, a rolled textile fabric impregnated with rubber or other suitable plastic, and a section 28 formed of compacted, looped, metal fabric of the type previously referred to. A single or multiple jacket 30 surrounds the composite core. The jacket may be of any of the types previously described.

A packing in accordance with the invention is substantially unaffected by temperature, oil and pressure and exhibits a much longer life under service conditions than the packings heretofore used. Due to the materials employed in the construction of the core and jacket, the lubricants impregnated into the packing have no harmful effects either in storage or service. It has been found that a packing in accordance with the invention is effective when subjected to temperatures up to say, 800° F. and to relatively high pressures.

Having thus described our invention in rather full detail, it will be understood that these details need not be strictly adhered to, but that various changes and modifications will suggest themselves to one skilled in the art, all falling within the scope of the invention as defined by the subjoined claims.

What we claim is:

1. A packing comprising a resilient core including compacted, resilient, knitted metal fabric composed of thin, flat, metal ribbons, and a heat-resistant sheath surrounding said core.

2. A packing comprising a resilient core of compacted, resilient, knitted, corrosion and heat resistant metal fabric composed of thin, flat, metal ribbons and a heat resistant sheath surrounding said core.

3. A packing comprising a resilient core of twisted, resilient, knitted metal fabric composed of thin, flat, metal ribbons and carrying a lubricating material and a heat-resistant sheath surrounding said core.

4. A packing including a resilient core comprising a plurality of intertwined individually twisted strands of resilient, knitted metal fabric composed of thin, flat, metal ribbons, and a sheath surrounding the core.

5. A packing including a resilient core comprising a resilient, twisted, knitted metal fabric composed of thin, flat, metal ribbons and carrying a lubricating material, and a sheath surrounding said core, said sheath comprising a textile fabric carrying a heat-resistant binder.

6. A packing including a resilient core comprising a plurality of intertwined individually twisted strands of resilient, knitted, corrosion-resistant metal fabric composed of thin, flat, metal ribbons, said core carrying a lubricating material, and a sheath surrounding said core, said sheath comprising a textile fabric impregnated with a heat-resistant binder.

7. A packing including a core having a yielding plastic impregnated section and a section formed of compacted, resilient, knitted, metal fabric composed of thin, flat, metal ribbons, and a heat-resistant sheathing surrounding said core.

JAMES DRISCOLL.
EMIL J. POLTORAK.